United States Patent [19]

Huizing et al.

[11] Patent Number: 4,904,530

[45] Date of Patent: Feb. 27, 1990

[54] MAGNETIC MATERIAL, MAGNETIC RECORDING MEDIUM, AND METHOD OF MANUFACTURING A MAGNETIC MATERIAL

[75] Inventors: Albert Huizing; Cornelis P. G. M. Zegers; Johannen J. Brondijk, all of Eindhoven, Netherlands

[73] Assignee: U.S. Philips Corporation, New York, N.Y.

[21] Appl. No.: 45,983

[22] Filed: May 4, 1987

[30] Foreign Application Priority Data

May 29, 1986 [NL] Netherlands .......................... 8601372

[51] Int. Cl.$^4$ ............................................. C04B 35/26
[52] U.S. Cl. .................... 428/402; 252/62.56; 252/62.64; 428/694; 428/900
[58] Field of Search .................. 428/694, 900, 402; 252/62.56, 62.64

[56] References Cited

U.S. PATENT DOCUMENTS

| | | | |
|---|---|---|---|
| 3,047,429 | 7/1962 | Stoller et al. | 252/62.56 |
| 4,425,250 | 1/1984 | Hibst | 252/62.56 |
| 4,664,831 | 5/1987 | Hibst et al. | 252/62.56 |
| 4,719,148 | 1/1988 | Stoppels et al. | 252/62.56 |

FOREIGN PATENT DOCUMENTS 1142214  2/1969  United Kingdom .

Primary Examiner—Paul J. Thibodeau
Attorney, Agent, or Firm—Norman N. Spain

[57] ABSTRACT

The invention relates to a magnetic material for use in the magnetic recording and playback of information, which material consists of ferrite particles having the composition $A_{1-y}Zn_yFe_2O_4$, wherein A is one or more bivalent metal ions, which material is suitable for use in a recording medium having a high information density in that the magnetic material comprises monodisperse ferrite particles having an average particle size between 5 and 250 nm, preferably between 10 and 50 nm, and in that y is between 0.05 and 0.35. The magnetic material preferably is Co-Zn-ferrite. The material is manufactured by coprecipitation of a mixture of hydroxides succeeded by recrystallization at elevated temperature and pressure.

6 Claims, 1 Drawing Sheet

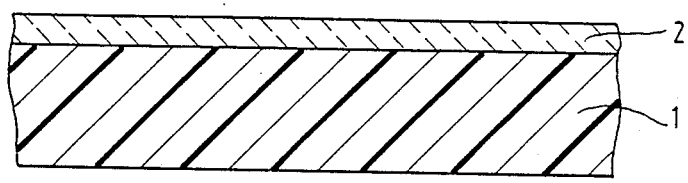

MAGNETIC MATERIAL, MAGNETIC RECORDING MEDIUM, AND METHOD OF MANUFACTURING A MAGNETIC MATERIAL

BACKGROUND OF THE INVENTION

The invention relates to a magnetic material for use in the magnetic recording and playback of information, which material consists of ferrite particles having the composition $A_{1-y}Zn_yFe_2O_4$, wherein A is one or more bivalent metal ions.

The invention also relates to a magnetic recording medium having a high information density.

The invention furthermore relates to a method of manufacturing a magnetic material.

Ferrite particles having the composition given hereinbefore are described, for example, in published Japanese Patent Application JP 59-55002, in which A is the $Mn^{II}$-ion. The coercive force of this material is 40 to 160 A/m. Such ferrite particles are used, to manufacture magnet cores, for example, by means of a sintering process. The ferrite particles have dimensions from 0.3 to 0.8 μm, the object of which is to achieve a good homogeneity during sintering.

SUMMARY OF THE INVENTION

It is the object of the invention to provide ferrite particles for use as magnetic storage elements in a recording medium having a high information density. For that purpose, the object of the invention is to provide ferrite particles having a high coercive force, for example, from 10 to 150 kA/m, preferably from 40 to 100 kA/m. Another object of the invention is to provide ferrite particles having a saturation magnetization from 175 to 900 kA/m, preferably from 280 to 700 kA/m and a remanence from 45 to 370 kA/m, preferably from 90 to 270 kA/m.

According to the invention this object is achieved by means of a magnetic material as described in the opening paragraph, which material is characterized in that the magnetic material comprises monodisperse ferrite particles having an average particle size between 5 and 250 nm, preferably between 10 and 50 nm, and in that y is between 0.05 and 0.20.

The small dimensions and the monodispersity of the ferrite particles make it possible to achieve a high information density. Monodispersity is meant to indicate that the particle size distribution shows only one maximum and that the spreading of the particle size is small. The ratio of the dimension of the largest 10% of the particles to the dimensions of the smallest 10% of the particles, is preferably less than a factor of 2. It has furthermore been established that the ferrite particles are monophase, which is in favour of the homogeneity and hence the information density to be achieved. The ferrite particles having the composition indicated hereinbefore may furthermore comprise small quantities of usually present impurities, for example Si and Cr.

BRIEF DESCRIPTION OF THE DRAWING

The sole FIGURE of the drawing is a cross-sectional view of a part of a magnetic recording medium of the invention.

DETAILED DESCRIPTION OF THE INVENTION

In a preferred embodiment of the magnetic material according to the invention, A has been selected from the group formed by bivalent ions of Co, Fe, Ni, Mn and Mg, wherein A preferably is $Co^{II}$. Cobalt zinc ferrite and manganese zinc ferrite are materials known per se, see for example C. Heck, "Magnetic Materials and their Applications", 1974, Butterworths, London, in particular pages 61 and 78, where notably the magnetic anisotropy and the magnetostriction of these materials are described. The use of the said materials in the form of very small particles is not obvious because such small particles cannot be obtained according to conventional methods, for example grinding.

In a further preferred embodiment of the magnetic material according to the invention, y is between 0.12 and 0.18.

Another object of the invention is to provide a magnetic recording medium having a high information density.

This object is achieved according to the invention by a recording medium which comprises a magnetic material according to the invention, which material has a coercive force from 10 to 150 kA/m, preferably from 40 to 100 kA/m. The magnetic material may be provided on a non-magnetic substrate in the form of a thin layer in a polymer binder material.

The particles have approximately a cubic shape and by applying a magnetic field during providing the magnetic layer they may be optionally oriented so that the recording medium is suitable for longitudinal or for vertical magnetic recording. It is also possible to manufacture a recording material for random recording, in which the magnetic layer does not have an easy axis of magnetization.

A further object of the invention is to provide a method of manufacturing a magnetic material which comprises monodisperse ferrite particles having an average particle size between 5 and 250 nm, preferably between 10 and 50 nm.

According to the invention this object is achieved by means of a method which comprises the following steps:

an aqueous solution which comprises $Fe^{III}$-, $Zn^{II}$- and A-ions is mixed with an aqueous solution of a strong base while forming a precipitate of a mixture of hydroxides, the precipitate in a suspension in water is kept at a temperature of 70° to 95° C. for at least 30 minutes, the suspension is neutralized until the pH is less than 8, the precipitate is recrystallized in a suspension in water at elevated temperature and pressure.

Particles which are smaller than approximately 1 μm cannot be manufactured by means of mechanical methods, for example by grinding. In the published Japanese Patent Application JP 59-55002 a method is described of manufacturing a ferrite powder, the particles of which have dimensions from 300 to 800 nm, in which a precipitate is formed of a mixture of hydroxides, which precipitate is treated at an elevated temperature and pressure without any intermediate step. In the method according to the invention the precipitate is kept at a temperature from 70° to 95° C. for some time as a result of which a fine crystalline material (dimensions of the particles smaller than 10 nm) with a spinel structure is formed. In the subsequent recrystallization step the uniformity of the particles increases, the particle size increasing only slightly.

In a preferred embodiment of the method in accordance with the invention the recrystallization is carried out for at least 1 hour at a temperature of 280° to 350° C. and at a pressure of 5 to 10 MPa.

The invention will now be described in greater detail with reference to an embodiment and with reference to a drawing the sole figure of which is a cross-sectional view through a part of magnetic recording medium according to the invention.

EXAMPLE

Approximately 100 g of Co-Zn-ferrite, wherein y=0.15, were prepared according to the following prescription. A first solution A was prepared by dissolving 342.4 g of $Fe(NO_3)_3.9H_2O$, 104.9 g of $Co(NO_3)_2.6H_2O$ and 19.0 g of $Zn(NO_3)_2.6H_2O$ in 700 ml of water. For this purpose other salts, for example sulphates, may also be used. A second solution B was manufactured by dissolving 140.0 g of NaOH in 700 ml of water.

The solutions were combined in a beaker glass at a low temperature via dropping funnels. The formed suspension was then heated to 80° C. and kept at that temperature for 1 hour. The suspension turns from brown to black due to the formation of a fine crystalline material having a spinel structure.

The suspension was washed with demineralized water until the pH had decreased from approximately 10 to less than 8. The precipitate was suspended in water to a total volume of 1300 ml and then transferred to an autoclave having a capacity of 2. The suspension was heated to a temperature of 300° C. at a heating rate of 100° C. per hour, which temperature was maintained for 1 hour. The maximum pressure was 8 MPa. The suspension was stirred at a rate of 500 rpm. The suspension was finally cooled at a rate of 100° C. per hour.

The magnetic material may be filtered off and dried at room temperature or may be further processed in the form of a suspension to prevent the formation of agglomerates. The particle size is 18.0 nm with a spreading of 1.3 nm.

The following magnetic properties were measured in the magnetic material: coercive force 47 kA/m, saturation magnetization 466 kA/m and remanence 92 kA/m.

A magnetic recording medium was manufactured from the magnetic material. On a substrate 1 of polyethylene terephthalate with a thickness of 12 $\mu$m, a layer 2 was provided in a thickness of 3 $\mu$m, the ferrite particles being provided in a polyester urethane binder, the filling degree being 50% by volume (approximately 80% by weight).

Other suitable substrate materials, both flexible and rigid materials, and binder materials may also be used. The magnetic recording medium may be manufactured, for example, in the form of a tape or a disc.

The magnetic material according to the invention is suitable for use in a magnetic recording medium, having a high information density in which the magnetic material may be used in an oriented form (longitudinal or vertical magnetic recording) or in a non-oriented form (random magnetic recording).

What is claimed is:

1. A magnetic material for use in the magnetic recording and playback of information, said material having a coercive force of from 10 to 150 k A/m and consisting of ferrite particles having the composition $A_{1-y}Zn_yFe_2O_4$, wherein A is one or more bivalent metal ions, characterized in that the ferrite particles have an average particle size between 5 and 250 nm, the ratio of the dimensions of the largest 10% of the particles to the dimensions of the smallest 10% is less than a factor of 2 and y is between 0.05 and 0.20.

2. The magnetic material of claim 1, wherein particles have average particle size of between 10 and 50 nm.

3. The magnetic material of claim 1, wherein A is at least one bivalent ion selected from the group consisting of bivalent ions of Co, Fe, Ni, Mn and Mg.

4. The magnetic material of claim 3, wherein A is $Co_{II}$.

5. A magnetic material as claimed in claim 3, characterized in that y is between 0.12 and 0.18.

6. A magnetic material as claimed in claim 1, characterized in that y is between 0.12 and 0.18.

* * * * *